United States Patent
Gordon

[15] 3,638,001
[45] Jan. 25, 1972

[54] METHOD AND APPARATUS FOR AVERAGING THE DIGITAL DISPLAY FOR A FLUCTUATING DIGITAL MEASUREMENT AND IMPROVING THE RESOLUTION OF THE MEASUREMENT

[72] Inventor: Gary B. Gordon, Cupertino, Calif.
[73] Assignee: Hewlett-Packard Company, Palo Alto, Calif.
[22] Filed: Mar. 4, 1970
[21] Appl. No.: 16,301

[52] U.S. Cl. ..........................235/152, 324/78 D, 324/99 D, 356/106
[51] Int. Cl. .....................................G01r 23/02, G01b 9/02
[58] Field of Search............235/152, 152 IE, 151.3, 151.31, 235/92 EA; 324/78 D, 79 D, 99 D, 186, 77; 356/106; 340/347 AD; 128/2.1

[56] References Cited

UNITED STATES PATENTS

| | | | |
|---|---|---|---|
| 3,087,487 | 4/1963 | Clynes.................................128/2.1 R |
| 3,247,365 | 4/1966 | Dell et al......................235/152 IE X |
| 3,409,375 | 11/1968 | Hubbard................................356/106 |
| 3,458,259 | 7/1969 | Bagley et al. ...........................356/106 |
| 3,459,926 | 8/1969 | Heilweil et al. ....................235/152 IE |

*Primary Examiner*—Joseph F. Ruggiero
*Attorney*—Roland I. Griffin

[57] ABSTRACT

A digital display system in which fluctuations in the last one or two numbers of a repetitive display value are removed by an averaging technique comprising the steps of determining the difference between the new incoming digital value and the last digital display value, taking a certain preselected percentage such as one percent of the difference between the new value and the last display value, and adding the new computed digital value to the value of the last display to produce a new average value for display. The resolution of the incoming digital values is increased by a statistical interpolation process whereby, in averaging over a large number of quantized incoming values, the resolution of the displayed values exceeds that of the quantization-limited input. This technique, as well as an alternate averaging system, is employed to reduce the jitter and enhance the resolution of the digital display of a distance measuring interferometer.

19 Claims, 9 Drawing Figures

INVENTOR.
GARY B. GORDON
BY Roland I. Griffin
ATTY

INVENTOR.
GARY B. GORDON
BY Roland D. Griffin
ATTY

METHOD AND APPARATUS FOR AVERAGING THE DIGITAL DISPLAY FOR A FLUCTUATING DIGITAL MEASUREMENT AND IMPROVING THE RESOLUTION OF THE MEASUREMENT

BACKGROUND OF THE INVENTION

Various forms of display apparatus for rendering readings of measured quantities such as voltage levels, frequency, etc., are presently in use, including analog displays, such as a panel meter, and digital displays (segmented display tubes, etc.). The digital display affords very much higher resolution than a meter display; the meter may give a 1 percent accuracy whereas the digital reading may be taken out to many more decimal places. The digital display is also free from parallax and other reading errors encountered in some analog displays.

Where the digital display is carried out to a number of decimal places for improved resolution, a rapid fluctuation in the data results in a jitter in the last few display tubes in the series and renders the reading of these last few digits difficult. On the other hand, the inertia of the mechanism of a panel meter will average out these fluctuations.

For example, in the digital display of laser interferometers the readings may be carried out to the 10 millionths place or $10^{-5}$ inch, the fifth display tube following the decimal in the series. Each digit in this last display tube represents a change in length measured by the interferometer of $10\mu$ inches; the preceding display tube in the series represents changes in length of $100\mu$ inches. Because of the high resolution afforded by these last two display tubes, a considerable amount of jitter is frequently encountered, particularly in the $10^{-5}$ column. Vibrations set up in the interferometer measurement path due, for example, to trucks passing the building, doors slamming, and machines or motors operating in the vicinity, produce fluctuations in the measured length, resulting in a rapid fluctuation between several numbers in the last display tube and, at times, between numbers in the $100\mu$-inch display tube. Air turbulence, similarly, can cause small changes in the apparent distance, and produce similar flutter. Since the display may be changing several hundred times a second, the persistence of the several displayed digits results in several numbers appearing simultaneously in the last display tube and fluctuating rapidly, making the reading of the actual display or the average of the display difficult for the operator.

Sometimes it is desirable to observe this vibration, but many times it would be advantageous to see through it. An example is measuring the deflection of a milling machine, produced by the loading when placing an item to be milled on it. This deflection will be small and is usually obscured by vibration several times the amplitude of the deflection.

Existing interferometers have resolutions of approximately 3, 6 or $12\mu$ inches, added to basic accuracies of better than 1 part per million. Thus, at distances of 3 to 12 inches or less the interferometers are resolution limited. Many important distance measurement applications in this range and under, such as integrated circuit mask cameras, microscope stages, etc., would benefit from greater resolution.

Simple methods for averaging to accomplish jitter reduction and/or improved resolution, such as, for example, by lengthening the time base gate in a frequency counter or by the low-pass filtering of the input of a voltmeter with a reactive circuit element, are not suitable for use with interferometers. Interferometers measure changes in distance rather than absolute distance; the present distance information is carried as the integral of past input data, plus the starting point (which is the constant of integration). Therefore averaging cannot be accomplished during the counting process, but must be performed afterwards.

BRIEF SUMMARY OF THE PRESENT INVENTION

A principal object of the present invention is to provide a novel method and apparatus whereby the resolution advantage of a digital display is combined with the low-pass filtering advantage of a panel meter display. In this technique, the fluctuations in a digital display are eliminated and the average reading is continuously displayed. The resolution of the digital values may also be increased substantially during the averaging process by a technique whereby, in averaging over a large number of separate quantized incoming digital values, interpolation is possible between input states incoming digital values.

Another object of the present invention is to provide a novel method and apparatus for reducing the jitter (i.e., smoothing) and enhancing the resolution of interferometer displays, including the above-mentioned preferred technique as well as an alternative averaging method and apparatus.

The preferred smoothing or averaging technique is accomplished by determining the difference between the new incoming digital value and the last digital value displayed, taking a certain preselected percentage of this difference, and adding this new computed value to the value of the last digital value displayed to produce a new average value for transmittal to the digital display tubes.

Therefore, rather than switching rapidly between the last display value and the new incoming value for each reading, the new display is moved in a much smaller increment toward the new incoming value. The percentage is kept small, for example, 1 percent, which results in elimination of the more undesirable fluctuations that may otherwise take place in the digital display.

When the new incoming value is changing to a substantially greater degree than the undesirable fluctuation, the averaging procedure is overridden and the new incoming value displayed directly.

The resolution of the digital values is increased by averaging over a large number of separate quantized incoming values whereby interpolation is possible between digital values. In interferometry, this has the advantage of extending resolution beyond the basic fringe spacing without resorting to elaborate phase interpolation schemes.

Although the preferred technique is explained with reference to its use with a two-frequency interferometer system, it should be understood that this invention may be applied to single-frequency interferometer systems as well as to other systems utilizing digital displays such as, for example, electronic counters or digital voltmeters.

The alternate technique for interferometer display jitter reduction and resolution enhancement is accomplished by taking a preselected number, $n$, of successive interferometer measurements, preferably a power of 10, digitally summing these readings in an accumulator, and dividing the sum by $n$, preferably by shifting the decimal place. Thus a new display value is obtained once every $n$ measurements instead of after every single measurement as in the preferred technique.

In U.S. Pat. application Ser. No. 557,167 entitled "Signal-to-Noise Ratio Enhancement Methods and Means" filed by Charles R. Trimble on June 13, 1966, and assigned to the same assignee as this present application, there is disclosed a technique for averaging an analog signal so that the noise may be removed from the signal displayed on an oscilloscope. This prior signal averaging system operates on an analog signal and utilizes binary techniques; the analog signal is divided into multiple channels and each channel is separately averaged. The input signal is either constant or changing very slowly, and the percentage that the old display is converged toward the new measurement point is a variable which allows near-equal weighting of all previously measured data points. In the present invention, the signal to be averaged is digital in form as opposed to analog, the arithmetic is decimal in form as opposed to binary, the input levels are quantized and not continuous, the incoming signal is single channel rather than multiple channel, and the updating percentage is a preselected constant, thus giving the heaviest weighting to the most recent data. In addition, statistical averaging is employed in the present invention to provide substantially increased resolution in the displayed signal in the presence of quantized inputs.

DESCRIPTION OF THE PREFERRED EMBODIMENTS

Figure 1:
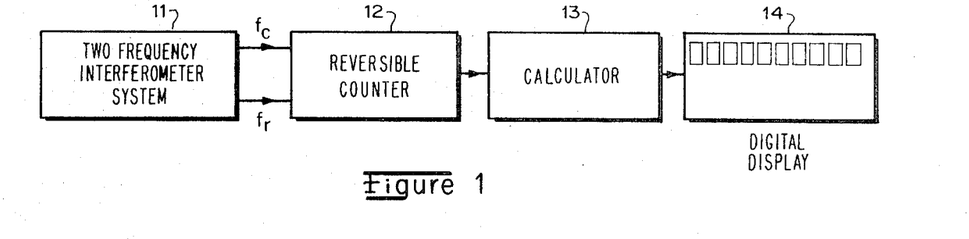
FIG. 1 is a block diagram of an interferometer system of the type employing the present invention.

Referring now to FIG. 1, there is shown a schematic diagram of a two-frequency, AC laser interferometer system of the type shown and described in U.S. Pat No. 3,458,259 issued on July 29, 1969, to Alan S. Bagley, et al., entitled "Interferometric System." The output of the laser interferometer 11 comprises a pair of radiofrequency signals, a reference frequency, $f_r$, and a comparison on measurement frequency, $f_c$. Reference frequency $f_r$ is a constant frequency of, for example, 2 MHz., and comparison frequency $f_c$ varies in accordance with the change in length of the distance being measured by the interferometer. When there is no change in length, $f_c=f_r=2$ MHz., while $f_c$ will vary up or down from 2 MHz. with increasing and decreasing measured lengths. For example, $f_c$ will vary 1 hertz for each fringe or one-quarter wavelength of light variation in the measured distance per second.

The two frequencies $f_c$ and $f_r$ are transmitted to an up-down, or reversible, counter 12 which up counts one frequency and down counts the other frequency, the output of the counter being the distance traversed. The output of counter 12 is transmitted to a calculator or computer circuit 13 where the counter distance output in quarter-fringes is converted to length in inches or millimeters, or to the rate of the distance change in inches or millimeters per second. These calculated values are then transmitted to a digital display means 14 where the values are reproduced on a series of display tubes for observation by the operator.

Figure 2:
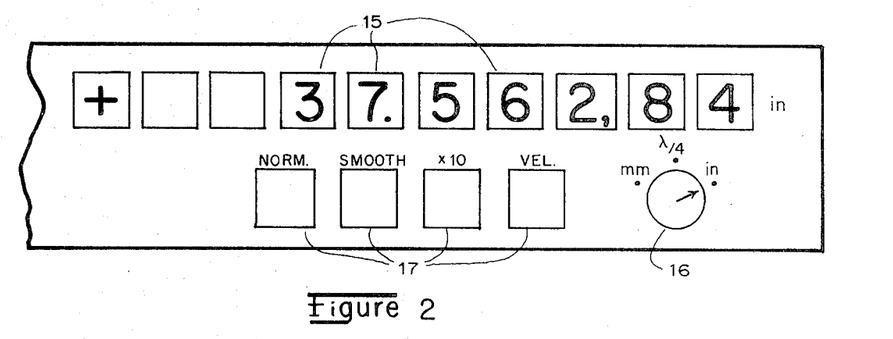
FIG. 2 shows a portion of the front panel of an interferometer system made in accordance with the present invention.

The front panel of a typical interferometer made in accordance with the present invention is shown in FIG. 2. Ten display tubes 15 are utilized, the first display tube on the left indicating the sign + or − which may be selected arbitrarily to designate the direction of movement of the measured object. A switch 16 selects the particular unit of length to be displayed, i.e., the length in inches, millimeters, or quarter wavelengths of light. The display shown is +37.56284 inches. Four pushbuttons 17 are provided to permit selection of the desired mode of display among normal mode, smoothing signal mode, tens multiplication, and velocity display.

The digital display, in the normal mode of operation, is carried out to the fifth decimal place, $10^{-5}$ inches (or $10^{-4}$ mm.) as illustrated in FIG. 2 where each digit in the last display tube represents a $10\mu$ inch change in length. The output of the interferometer is resolution limited to one fringe, or approximately $6\mu$ inches, and the computed length is rounded off to the nearest $10\mu$ inches for display in the last display tube.

In the "x10" mode of operation, the digits, including the decimal point, are all shifted one display tube to the left, and the last display tube on the right is now used to display changes of $1\mu$ inch (or $10^{-5}$ mm.). Concomitantly, a novel averaging technique, described below, is employed to increase the resolution of the interferometer from approximately $6\mu$ inches to at least $1\mu$ inch. The resolution of the averaged measurement displayed is therefore enhanced by a factor of at least 6 over the resolution of the unaveraged measurement. Smoothing is also provided in the "x10" mode and is provided independently of resolution extension in the smoothing mode mentioned above.

Figure 3:
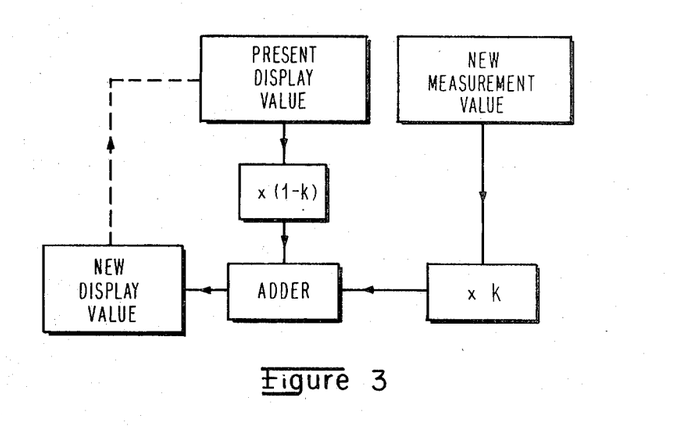
FIG. 3 is a block diagram of one algorithm for performing the digital display smoothing technique of the present invention.
Figure 4:
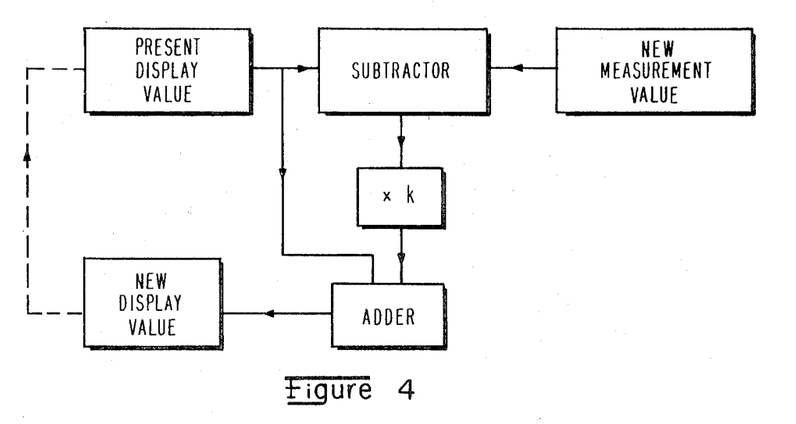
FIG. 4 is a block diagram of another algorithm for performing the desired smoothing.

The averaging circuit for accomplishing resolution extension and smoothing may take any one of several forms, and the algorithm of two such circuits are shown in FIGS. 3 and 4. In the algorithm of FIG. 3 the computation is as follows:

$ND=(1-k) PD+k NM$ where $ND$ is the new display value;

$PD$ is the present or existing display value;

$NM$ is the new measurement value; and $k$ is a selected factor such as 1 percent (0.01) or one-tenth percent (0.001).

Assuming $k$ is 0.01, then $ND=0.99 PD-0.01 NM$

Thus, instead of using the new measurement for the next display, the value of 1 percent of the new measurement is taken and is added to the value of 99 percent of the old or existing display value, to give the new value to be displayed. Therefore, rather than display the full change between successive readings, the new display value will move toward the new measured value from the present display value by a selected factor. This results in an averaging or smoothing of the displayed signal, and eliminates rapid fluctuations in the displayed signal. If the successive new measurements do not change in value, the new display values exponentially approach the measured value.

The algorithm for another smoothing circuit is shown in FIG. 4 where the computation is as follows:

$ND= PD+k(NM-PD)$

Assuming $k$ is 1 percent, then the new display value is determined by subtracting the new measurement value from the present display value, taking 1 percent of this difference, and adding the result to the present display value.

These systems thus perform a digital low-pass filtering of the digital data much as the inertia of a meter's movement performs low-pass filtering of its analog display. This digital low-pass filtering may be called "fractional updating" of a display; the old display is converged only a small percentage of the way toward the new measurement.

Figure 5A:
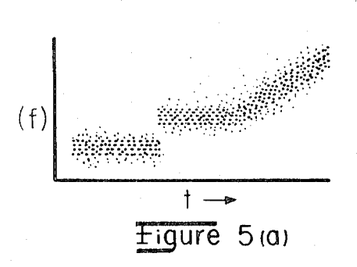
FIGS. 5a, b, and c are graphs which illustrate the convolution operation followed in performing the digital display smoothing.
Figure 5B:
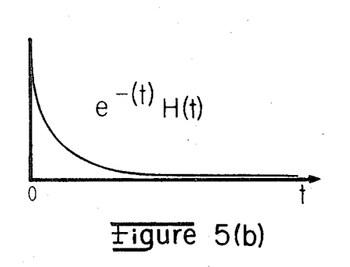
Figure 5C:
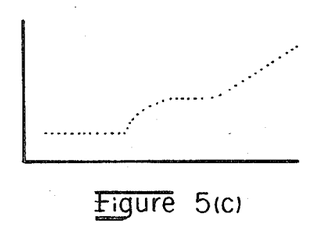

The filtering effect may be analyzed by referring to FIGS. 5a, b and c where FIG. 5a shows a plot of the data as a sampled function which is the sum of a desired low-frequency component and an undesired high frequency or noise component. The digital smoothing applies a weighted average to the data points corresponding to a mathematical convolution operation where the decaying exponential of FIG. 5b is convolved, or "slid through," the data points of FIG. 5a. This convolution in the time domain results in the averaged or smoothed data points of FIG. 5c where only the low-frequency components are left.

In the use of this smoothing technique with the laser interferometer, $k$ was chosen to be 1 percent since this provided optimum averaging in an acceptable short time period. It is desirable to average long enough to average out vibrations in the 5 to 100 Hz. rate while passing 1 Hz. motion. Measurements are made at least twice the maximum frequency, or 200 Hz., to avoid synchronous sampling problems. It is desirable that the reading not be sluggish and that the operator see the measurement change stabilized in the digital display within a second or so after the length change.

When the smoothing feature is not desired, for example, when the length being measured is undergoing a steady change so that the digital display reading is rapidly increasing or decreasing, the factor $k$ is changed to one, and the new display is the new measured value; no averaging results. The factor $k$ may be changed to one by a manual switch on the front of the computer panel or the factor may be changed automatically in response to a detection of the rapid change in measurement. For example, in the interferometer if the $100\mu$-inch display tube changes twice in a short time period, $k$ is automatically changed to one. This feature also allows the display to instantly update itself when an input is first applied.

Figure 6:
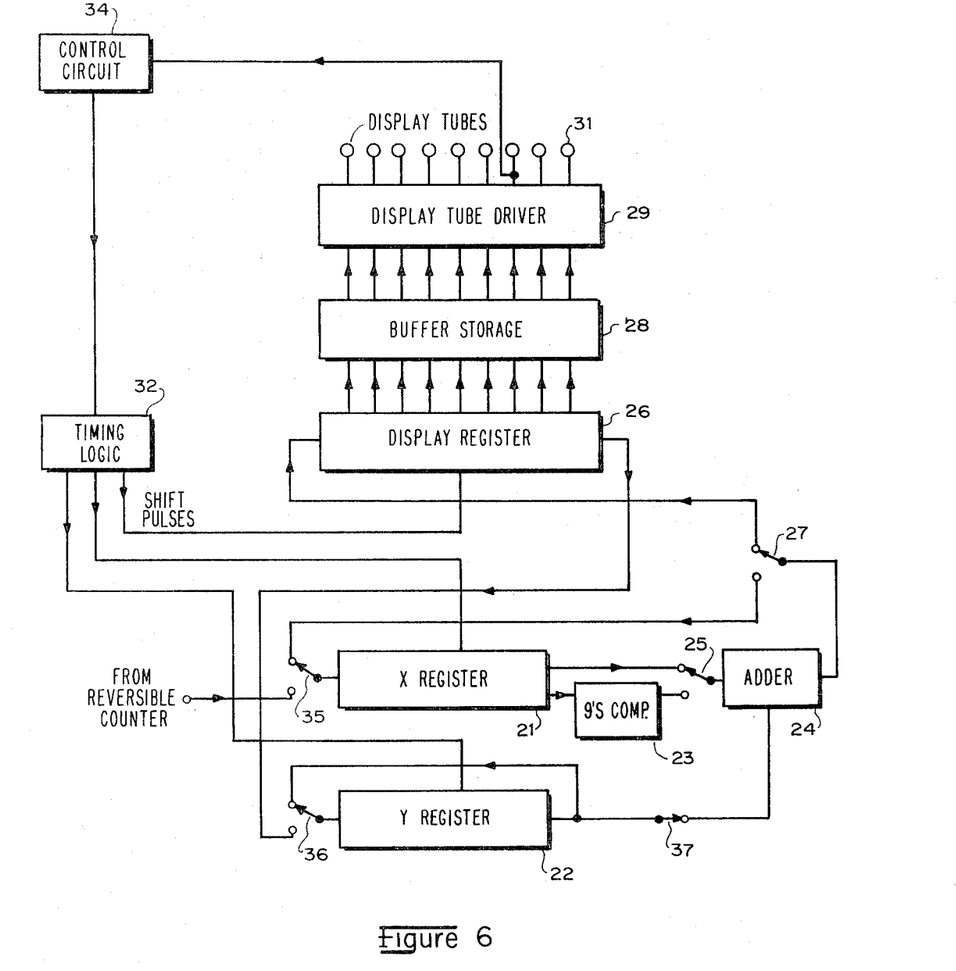
FIG. 6 is a block diagram of one computer system which performs the smoothing algorithm of FIG. 4.

Referring now to FIG. 6, there is shown a block diagram of a calculating system suitable for use with a reversible counter input and digital display output for performing the algorithm of FIG. 4. All of the addition and subtraction functions may be carried out using a pair of shift registers designated as an X-register 21 and a Y-register 22, a 9's complimenter 23 coupled to the output of the X-register 21, and an adder circuit 24 coupled to the X-register 21 and to the 9's complimenter through an electronic switch 25. When addition of the amounts in the X and Y register is desired, the adder 24 is coupled directly through gate 25 to the X-register 21. In subtracting X and Y, the adder 24 is connected through gate 25 to the 9's complimenter in well-known manner.

The output of the adder 24 may be coupled to the input of the display shift register 26 through gate 27 so that the calculated value may be serially entered in the register 26 in binary-coded decimal form (BCD). After the computer value has been serially shifted into register 26, this value is parallel transferred into the gatable buffer storage circuit 28 which, in turn, feeds the display tube driver 29 and the individual display tubes 31.

The three shift registers 21, 22, and 26 receive their shift pulses from the timing logic circuit 32. During the smoothing operation, the control circuit 34 achieves, using shifting, the division of the contents of the X-register by 100 or 1,000.

The input of the X-register 21 may be coupled to the output of the reversible counter 12 or the output of the adder 24 dependent on the position of the gates 35 and 27. The input of the Y-register 22 may be coupled through gate 36 to either the output of the display register 26 or to its own output.

The operation of this system will be described in terms of serially shifting digits from register to register, but it should be understood that parallel transfer may be employed.

Assume that the existing reading in the display tubes 31 is also lying in the display register 26 and the new incoming reading is stored in the X-register 21. The new measurement is transferred to the register 21 from the counter circuit via the lower path of gate 35. The old reading in the display register 26 is now shifted in response to shift pulses from the timing logic 32 serially down into the Y-register 22 through the lower path of gate 36.

The first computation is to subtract the old or existing reading in the Y-register 22 from the new reading in the X-register 21, and this is accomplished by sending the reading of the X-register through the 9's complimenter 23 into the adder 24 where it is added to the reading from the Y-register 22. The result may require a second pass through the complimenter, depending on the outcome of the first subtraction. The Y- register output is interrupted at gate 37 during this second pass.

The difference between the new measurement value and the old or existing reading is now stored in X-register 21. This difference is divided by 100 by shifting the digits in the X-register two places to the right in response to shift pulses from the timing logic circuit 32.

At the time the digits from the Y-register 22 are transferred to the adder 24, they are also fed back through the upper path of gate 36 so that the existing digital reading is restored in the Y-register 22.

Now, the readings in the two registers, X and Y, are shifted out into the adder 24 where they are added and the new result sent to the display register 26 to be utilized as the next value to be displayed in the display tubes.

When the measured length is actually changing, it is not desirable to perform the averaging function since the numbers are changing rapidly in one direction or the other and averaging would not be of benefit to the observer. Although there are many ways to disable the averaging function during changing length measurements, one technique is shown in FIG. 6.

The control circuit 34 is coupled to the input of the third display tube from the right which, in the inches measurement mode during smoothing, is the $10^{-3}$ or 0.001-inch column. If there are two changes in the reading of this tube within a short time period, e.g., one-hundredth of a second, control circuit 34 operates to modify the timing logic 32 to prevent the two shift pulses, which perform the step of dividing by 100 (or multiplying by 0.01), from being sent to the X-register. Therefore, the averaging algorithm is not performed during the period the control circuit 34 detects rapid switching in the $10^{-4}$ display tube, although the computer apparatus of FIG. 6 will still operate to deliver the new measurement values to the display register 26 just as if the division step had been performed. The actual measurement value is therefore displayed in place of the average value.

This is only one of many methods and apparatus that will immediately become obvious to those skilled in the art for performing the algorithm $$ND = PD - k(NM - PD)$$

The algorithm of FIG. 4 may be similarly carried out by well-known calculating techniques. Other algorithms may be easily adopted for performing the smoothing or averaging. Although the system shown herein is digital in form, it could just as readily be binary in form.

This smoothly technique also allows the digital reading of the interferometer to be substantially increased in resolution by the procedure of interpolating between fringes by averaging. As stated above, the basic resolution unit of the interferometer is one fringe or approximately $6\mu$ inches, each integer output representing a step or quanta of $6\mu$ inches, and the data is derived in such a manner that an input lying between the $6\mu$-inch quanta steps will sometimes produce the lower reading, and sometimes produce the larger reading, the ratio of the two being proportional to the ratio of the difference between the lower quanta level and the input to the difference between the input and upper quanta level. By taking a large number of readings of the basic unit and averaging these readings, a new, more highly resolved average results. For example, in 1,000 readings, if 100 were at $0\mu$ inch and the other 900 were at $6\mu$ inches, statistical averaging would result in an average reading of 90 percent of $6\mu$ inches or $5.40\mu$ inches. Thus, although the smallest unit of measurement is $6\mu$ inches (in the inches measurement mode), the measurement value can be resolved to tenths of a microinch or more by the arithmetic steps performed in the computer. Not all of the new digits of resolution are meaningful, however. The error standard deviation drops as the square root of the number of averages taken. The "5.0" in this example is quite accurate, the "0.4" is of some use, and the "0.00" is of no use.

In order to accomplish resolution extension a large number of readings are desirable and the factor $k$ in the algorithm set forth above is made 0.001 instead of 0.01. This results in averaging over a slightly longer period of time because of the increased number of readings making up the total for averaging but renders greater resolution. Note that $k$ may be made 0.001 by shifting the number in the X-register 21 three places instead of two places during the division step of the algorithm.

Since the resolution is extended to $1\mu$ inch, the displayed digits are shifted one display tube to the left so that, for example, the additional digit "5" in the illustration given above can be shown in the rightmost display tube which normally displays the 10's of $\mu$ inches digit.

Figure 7:
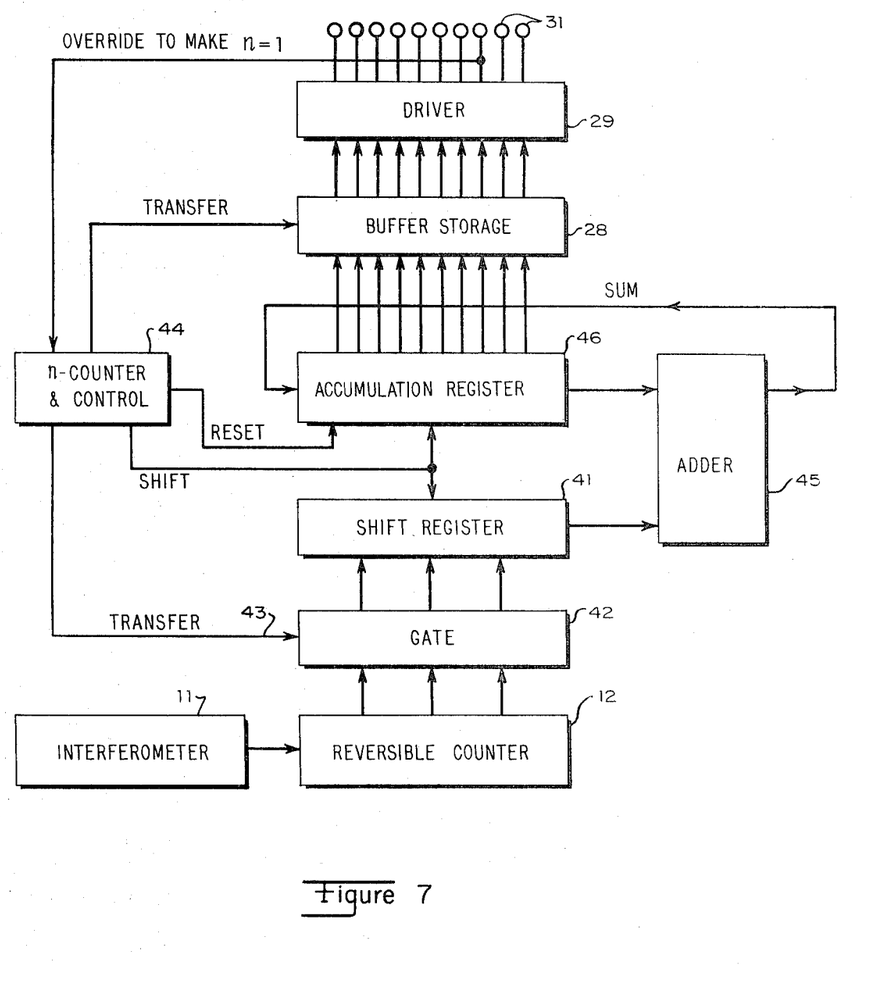
FIG. 7 is a block diagram of an alternate computer system for performing the averaging for an interferometer.

The alternative method for reducing jitter and enhancing the resolution of the digital display of a laser interferometer is shown in FIG. 7. Here $n$ sequential distance readings (for example $n=100$) from the reversible counter 12 are sequentially transferred into shift register 41 via gating network 42 under control of the transfer command 43 from the $n$ counter and control circuit 44. Each new value in the shift register 41 is then added in adder 45 to the contents of the accumulator register 46. The sum then replaces the previous contents of the accumulator register 46. After $n$ additions have been performed, as determined by control 44, the sum held in accumulator register 46 is transferred into the buffer storage 28 of the digital display.

Division of the sum by $n$ is most easily accomplished by making $n$ a power of 10 and shifting the decimal point in the display as appropriate. After transfer to the display, the accumulator register 46 is reset and the cycle repeated. Thus a new display is made available only after every $n$ cycles.

Many variations are possible which solve the same basic algorithm $$ND = \frac{\sum_{1}^{n} NM}{n}$$

Also, of course, a fringes-to-inches or mm. conversion may be interspersed between the counting and averaging operations, or between the averaging and the display operations.

When the measured lengths are changing rapidly, the averaging function is disabled as described above with reference to FIG. 6 by sensing the input to the $10^{-3}$ display tube to detect rapid rate changes and change $n$ in the counter 44 to unity.

In order to achieve resolution extension by the averaging technique described above, a random uncertainty of at least one quanta jitter must be present in the interferometer. This is inherent in the interferometer described; in other systems, if it was not present, it would have to be artificially superimposed.

It should also be noted that the algorithm of FIG. 3, i.e., $ND=(1k)PD+k\ NM$ may be rewritten as the algorithm $ND=PD+b0(NM-PD)$ of FIG. 4 and, when the latter algorithm is used in the claims, the former algorithm as well as equivalent variations thereof are encompassed thereby.

I claim:

1. Apparatus for providing an average digital display from a series of sequentially occurring digital inputs which are fluctuating in value, said apparatus comprising:
   input means for providing a series of sequentially occurring digital inputs;
   storage means for storing one average digital value derived from each of said digital inputs;
   computation means for combining the existing average digital value and the value of the new digital input to obtain a new updated average digital value for storage in said storage means by use of the relationship $ND=PD+k(NM-PD)$, where $ND$ is the new updated average digital value, $PD$ is the existing average digital value, $NM$ is the value of the new digital input, and $k$ is a factor less than one; and
   a digital display means coupled to said storage means for displaying a quantity proportional to the updated average digital value stored in said storage means.

2. Apparatus as claimed in claim 1 including means for at times overriding said computation means whereby the digital inputs are stored directly in the storage means without averaging.

3. Apparatus as claimed in claim 2 wherein said overriding means becomes operative at those times when the rate of change of the average digital value exceeds a predetermined digital value.

4. Apparatus as claimed in claim 1 wherein said computation means comprises a first digital register for recording a digital value therein and an adder-subtractor circuit, and said storage means comprises a second digital register for recording the updated digital value therein.

5. Apparatus as claimed in claim 1 including a laser interferometer for producing a series of sequentially occurring digital outputs representing measured distances, and means for coupling said digital outputs to said input means whereby said digital outputs may be averaged.

6. Apparatus as claimed in claim 5 including means for at times overriding said computation means whereby the digital outputs of said interferometer are stored directly in the storage means without averaging.

7. Apparatus as claimed in claim 6 wherein said overriding becomes operative at those times when the rate of change of the average digital value exceeds a predetermined digital value.

8. Apparatus as claimed in claim 1 wherein said inputs are resolution-limited in accuracy and contain a superimposed random uncertainty of at least one quanta, and wherein said computation means includes means for carrying out the new updated average digital value to at least one more decimal place than the sequentially occurring digital inputs.

9. Apparatus as claimed in claim 8 including means for at times overriding said computation means whereby the digital inputs are stored directly in the storage means without averaging.

10. Apparatus as claimed in claim 9 wherein said overriding means becomes operative at those times when the rate of change of the average digital value exceeds a predetermined digital value.

11. Apparatus as claimed in claim 8 wherein said computation means comprises a first digital register for recording a digital value therein and an adder-subtractor circuit, and said storage means comprises a second digital register for recording the updated digital value therein.

12. Apparatus as claimed in claim 8 including a laser interferometer for producing a series of sequentially occurring digital outputs representing measured distances, and means for coupling said digital outputs to said input means whereby said digital outputs may be averaged.

13. Apparatus as claimed in claim 12 including means for at times overriding said computation means whereby the digital outputs of said interferometer are stored directly in the storage means without averaging.

14. Apparatus as claimed in claim 13 wherein said overriding means becomes operative at those times when the rate of change of the average digital value exceeds a predetermined digital value.

15. A distance-measuring system comprising:
   a laser interferometer including means for producing a series of sequentially occurring digital position indications which are resolution-limited in accuracy and contain a superimposed random uncertainty of at least one quanta;
   storage means for accumulating the sum of said sequentially occurring digital position indications;
   counter means to tally a selected number $n$ of said sequentially occurring digital position indications;
   computation means for obtaining an average digital position indication, said computation means comprising an adder to add the new digital position indication to the accumulated sum then existing in the storage means and replace the existing accumulated sum with the new sum and division means for dividing the accumulated sum after $n$ digital position indications have been summed, by $n$, in accordance with the following relationship:

$$ND = \frac{\sum_{1}^{n} NM}{n}$$

where $ND$ is the computed average of $n$ inputs and $NM$ is a single digital position indication, to obtain an average digital position indication of at least one more decimal place than the sequentially occurring digital position indications; and
   a digital display means coupled to said storage means for displaying a quantity proportional to the average digital position indication.

16. Apparatus as claimed in claim 15 including means for at times overriding said computation means whereby the digital inputs are stored directly in the storage means without averaging.

17. Apparatus as claimed in claim 16 wherein said overriding means becomes operative at those times when the rate of change of the average digital value exceeds a predetermined digital value.

18. Apparatus as claimed in claim 15 wherein said computation means comprises a first digital register for recording a digital value therein and an adder-subtractor circuit, and said storage means comprises a second digital register for recording the average digital position indication therein.

19. Apparatus as claimed in claim 15 where $n=b^x$, $b$ is the base of the number system used by the computation means, $x$ is a positive integer, and the division means divides the accumulated sum by moving its decimal point $x$ places to the left.

* * * * *

UNITED STATES PATENT OFFICE
CERTIFICATE OF CORRECTION

Patent No. 3,638,001  Dated January 25, 1972

Inventor(s) Gary B. Gordon

It is certified that error appears in the above-identified patent and that said Letters Patent are hereby corrected as shown below:

Column 2, line 6, after "between" delete -- input states --;

Column 4, line 18, "ND=0.99 PD-0.01 NM" should read -- ND=0.99 PD+0.01 NM --;

Column 6, line 17, "ND=PD-k(NM-PD)" should read -- ND=PD+k(NM-PD) --; line 28, after "quanta of" insert -- approximately --;

Column 7, line 28, "ND=(1k)PD+k NM" should read -- ND=(1-k)PD+k NM --; line 29, "ND=PD+b0(NM-PD)" should read -- ND=PD+k(NM-PD) --.

Signed and sealed this 15th day of August 1972.

SEAL)
ttest:

DWARD M. FLETCHER, JR.  ROBERT GOTTSCHALK
ttesting Officer  Commissioner of Patents